Patented Nov. 4, 1924.

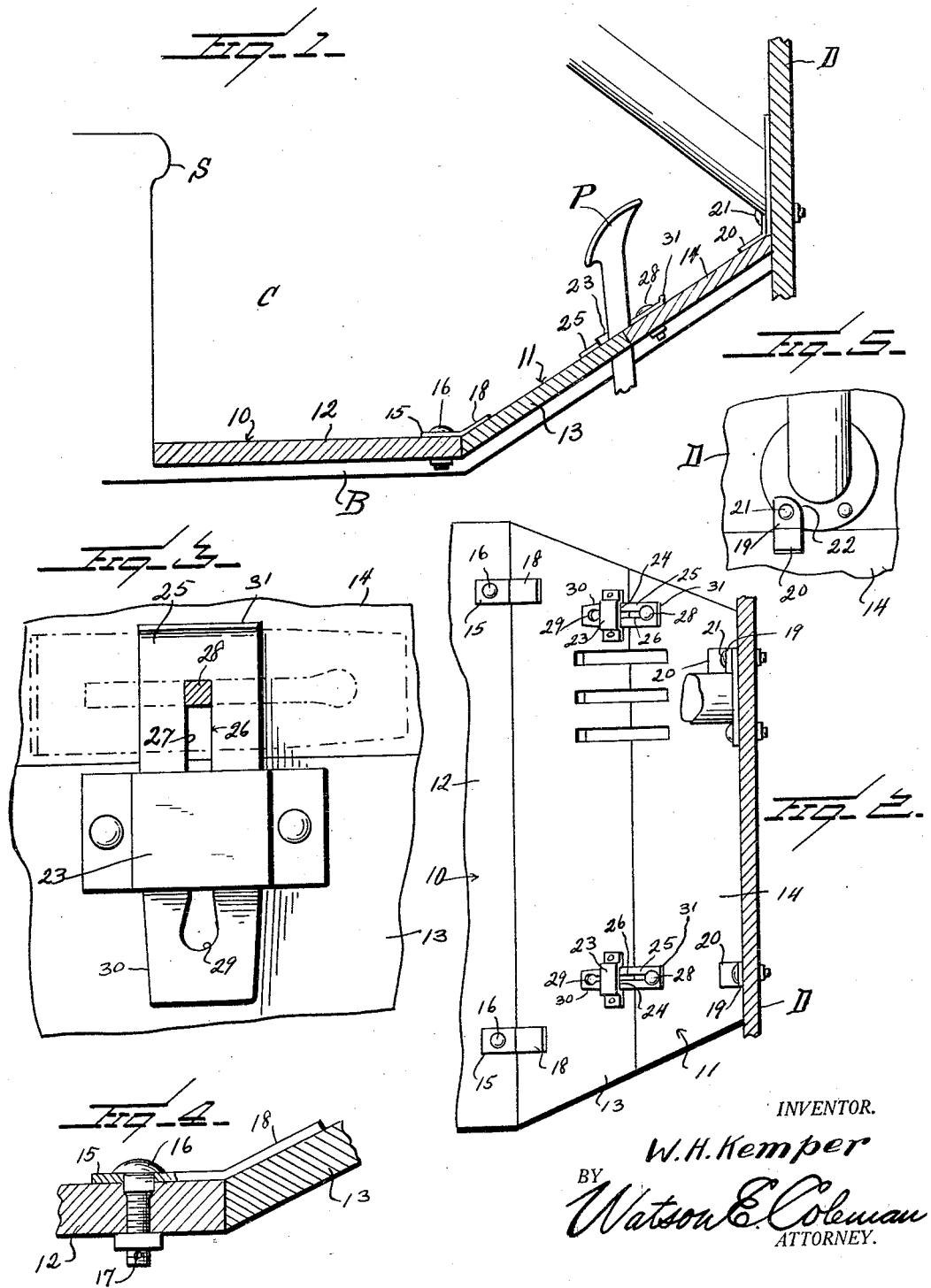

1,513,912

UNITED STATES PATENT OFFICE.

WILLIS HIATT KEMPER, OF INDUSTRY, ILLINOIS.

FOOTBOARD HOLDER FOR VEHICLES.

Application filed May 19, 1923, Serial No. 640,139. Renewed September 25, 1924.

*To all whom it may concern:*

Be it known that I, WILLIS H. KEMPER, a citizen of the United States, residing at Industry, in the county of McDonough and State of Illinois, have invented certain new and useful Improvements in Footboard Holders for Vehicles, of which the following is a specification, reference being had to the accompanying drawings.

This invention relates to foot board holders for vehicles and more particularly to means for preventing rattling and shifting of the foot boards of automobiles.

An important object of the invention is to provide a device of this character which while firmly holding the foot board in position is readily positionable to permit of removal of the board when this is desired.

A still further object of the invention is to provide devices of this character which are simple and effective and which at the same time may be very cheaply produced.

These and other objects I attain by the construction shown in the accompanying drawings, wherein for he purpose of illustration is shown a preferred embodiment of my invention and wherein:—

Figure 1 is a sectional view taken through the cockpit of an automobile showing floor board holding means constructed in accordance with my invention;

Figure 2 is a plan view thereof;

Figure 3 is an enlarged detail view showing the mounting of the fastener proper;

Figure 4 is a detail view showing the mounting of the holding clip; and

Figure 5 is a rear elevation showing the holding clip applied to the steering column brace.

Referring now to the drawings and more particularly to Figure 1 thereof, the cockpit C of the vehicle represented by the space between the front seat S and dash D thereof is floored, the flooring consisting of a bottom section 10 and an inclined section 11 connecting the bottom section with the dash, these sections being supported by suitable braces B carried by the body of the vehicle. The section 10, or bottom section, is usually in the form of a single board 12, while the section 11, or inclined section, is formed of two separate boards 13 and 14 abutting the bottom board 12 and dash D, respectively, the edges of these boards 13 and 14 meeting and being provided with slots in which operate pedals P by means of which the vehicle is controlled.

In the ordinary construction of vehicles of this character, the floor boards 12, 13 and 14 are not fastened in any way and accordingly these floor boards have a tendency to move about, with the result that they often become separated from the supports or braces B thereof. This is particularly true of the boards 13 and 14, the braces B of which converge forwardly and from which accordingly the boards disengage upon a downward movement thereof, being disengaged from their braces if an occupant of the vehicle accidentally steps thereon is extremely likely to receive an injury. Furthermore, these boards sometimes drop through to the bottom of the car and are lost.

In accordance with my invention I secure to the upper surface of the foot board 12 securing elements 15, each comprising a V-shaped plate the arms of which are spaced through an angle equal to the angle between the board 12 and board 13 when these boards are in the proper position in the cockpit and upon their braces B. One securing element 15 is disposed adjacent each end of the board 10 and these securing elements are fastened to the board by means of carriage bolts 16 extending through the board 12 and having the nuts thereof arranged upon the lower side of the board and held against loss by any suitable means, such as cotter keys 17. The squared shanks of the carriage bolts 16 will prevent rotation of the plates and will maintain the same at all times with the holding arm 18 thereof positioned above the upper surface of the floor board 13 to prevent upward movement thereof. Upon the dash D securing elements 19 similar to the securing elements 15 are provided, the angle between these securing elements being equal to the angle between the dash and the board 14, the holding arms 20 of these braces abutting the upper surface of the board 14. The securing element 20 at one side of the dash is maintained in position by one of the carriage bolts 21 of the steering post support S carried by the dash. Due to the positioning of the carriage bolt 21 it is necessary that one corner of the attaching arm of this brace 19 be cut away as indicated at 22.

It will be obvious that with the securing elements 15 and 19 in position, the only means whereby the boards 13 and 14 may escape from their position upon the braces B is by elevation of the engaged edges of these boards or of one thereof. In order to prevent such elevation I provide upon the lower inclined board 13 at opposite sides thereof keepers 23 which are secured to the board 13 and having the receiving slot 24 thereof directed toward the board 14. In alignment with this receiving slot are mounted upon the board 14 locking plates 25 in which are formed key hole slots 26, the stem portions 27 of which are of considerable length. In the board 13, at points spaced from the lower edge thereof a distance slightly greater than one-half the width of the plate 25, I mount carriage bolts 28, the squared portions of the shanks of which are of a width equal to the width of the stem portion 27 of the slot 26. The eye portion 29 of the key hole slots of the plates 25 is arranged at the lower ends of these plates and so spaced from the lower ends that when the squared shank of the bolts is engaged in this eye portion the end of the plate is disengaged from its keeper 23 and accordingly the plate may be rotated, this eye portion being of sufficient diameter to permit of such rotation. It will be obvious that by rotating the plates through 90° and shifting the same to engage the stem portion 27 of the slots with the squared shanks of the carriage bolts 28, these plates will be held in angular position, and since the bolts 28 are spaced from the edge of the board 14 a distance greater than one-half the width of the plate 25, these plates will clear the board 13 permitting the same to be elevated and removed. When the boards are replaced the plate is rotated to bring the same in alignment with the keeper and then slid downwardly until it is fully engaged therein. To permit of ready engagement the lower ends of these plates are preferably tapered transversely as indicated at 30. At the upper ends the plates are preferably provided with a slight flange which may be engaged by the fingers in manipulating the plate.

From the foregoing it will be seen that by the use of apparatus constructed in accordance with my invention the floor boards of the vehicles will be firmly held against movement, thus preventing the loss thereof and possible injury to the occupants of the vehicle. It will furthermore be obvious that certain changes in the construction thereof will be necessary in adapting the same to different types of vehicles and I accordingly do not limit myself to this specific arrangement hereinbefore set forth except as hereinafter claimed.

I claim:—

1. In combination with a vehicle cockpit embodying a horizontal board, a dash and a pair of inclined boards, one abutting the dash and the other the adjacent edge of the horizontal floor board, adjacent edges of the inclined boards meeting to complete the flooring, of means carried by the horizontal floor board and dash engaging the adjacent edges of their engaged inclined floor boards to prevent elevation thereof, and means carried by one of the inclined floor boards and having interlocking engagement with coacting means upon the other of the inclined floor boards for preventing elevation of the meeting edges thereof, comprising a longitudinally slotted plate carried by the first named inclined floor board and a keeper carried by the second named floor board and from which the plate is disengageable upon longitudinal movement thereof, the slot of said plate being provided with an enlargement permitting rotation of the plate when fully disengaged with its keeper.

2. In combination with a vehicle cockpit embodying a horizontal board, a dash and a pair of inclined boards, one abutting the dash and the other the adjacent edge of the horizontal floor board, adjacent edges of the inclined boards meeting to complete the flooring, of means carried by the horizontal floor board and dash engaging the adjacent edges of their engaged inclined floor boards to prevent elevation thereof, and means carried by one of the inclined floor boards and having interlocking engagement with coacting means upon the other of the inclined floor boards for preventing elevation of the meeting edges thereof, comprising a longitudinally slotted plate carried by the first named inclined floor board and a keeper carried by the second named floor board, the slot of said plate being provided with an enlargement permitting rotation of the plate when fully disengaged with its keeper, and a mounting member for said plate comprising a bolt having a squared shank fitting the major portion of the slot thereof, said bolt being spaced from the edge of the floor board a distance greater than one-half the width of the plate.

In testimony whereof I hereunto affix my signature.

WILLIS HIATT KEMPER.